(12) United States Patent
Stuhlmüller et al.

(10) Patent No.: US 6,672,069 B1
(45) Date of Patent: Jan. 6, 2004

(54) METHOD AND DEVICE FOR INCREASING THE PRESSURE OF A GAS

(75) Inventors: Franz Stuhlmüller, Erlangen (DE); Thomas Weber, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 35 days.

(21) Appl. No.: 10/069,919

(22) PCT Filed: Aug. 31, 2000

(86) PCT No.: PCT/DE00/02975

§ 371 (c)(1),
(2), (4) Date: Mar. 1, 2002

(87) PCT Pub. No.: WO01/16471

PCT Pub. Date: Mar. 8, 2001

(30) Foreign Application Priority Data

Sep. 1, 1999 (DE) .......................... 199 41 685

(51) Int. Cl.⁷ ............................ F04B 23/04; F04F 5/00; F02G 3/00; F02B 43/00
(52) U.S. Cl. ............................ 60/772; 60/726; 60/727; 60/728; 417/53; 417/76; 417/173
(58) Field of Search ............................ 417/76, 84, 123, 417/53; 60/39.12, 772, 726, 727, 728

(56) References Cited

U.S. PATENT DOCUMENTS

| 4,677,829 A | 7/1987 | Archer et al. |
| 4,765,148 A | * 8/1988 | Ohashi ................ 62/116 |
| 5,507,141 A | * 4/1996 | Stigsson ............. 60/775 |
| 5,688,296 A | 11/1997 | Andrus, Jr. et al. |
| 5,918,466 A | 7/1999 | Cloyd et al. |
| 6,247,301 B1 | * 6/2001 | Brannstrom et al. ...... 60/39.12 |
| 6,301,873 B2 | * 10/2001 | Hannemann et al. ...... 60/39.12 |

FOREIGN PATENT DOCUMENTS

| DE | 870 781 | 3/1953 |
| DE | 26 42 347 | 4/1977 |
| DE | 37 44 565 A1 | 7/1988 |
| DE | 38 01 886 A 1 | 10/1988 |
| EP | 713553 | 8/1954 |
| EP | 0 462 458 A1 | 12/1991 |
| JP | 63-285230 | 11/1988 |

* cited by examiner

Primary Examiner—Charles G. Freay
(74) Attorney, Agent, or Firm—Harness, Dickey & Pierce, P.L.C.

(57) ABSTRACT

A method in which an air mass flow supplied to a compressor in a power plant is divided in a flow divider into a small partial flow and into a larger partial flow. The smaller partial flow is supplied to an ejector via an air cooler and a booster. The larger partial flow is supplied to the suction line of said ejector. Both partial flows are combined in the ejector. The mass flow which is combined at the outlet of the ejector can be used as pressurized air in various components of a power plant.

20 Claims, 1 Drawing Sheet

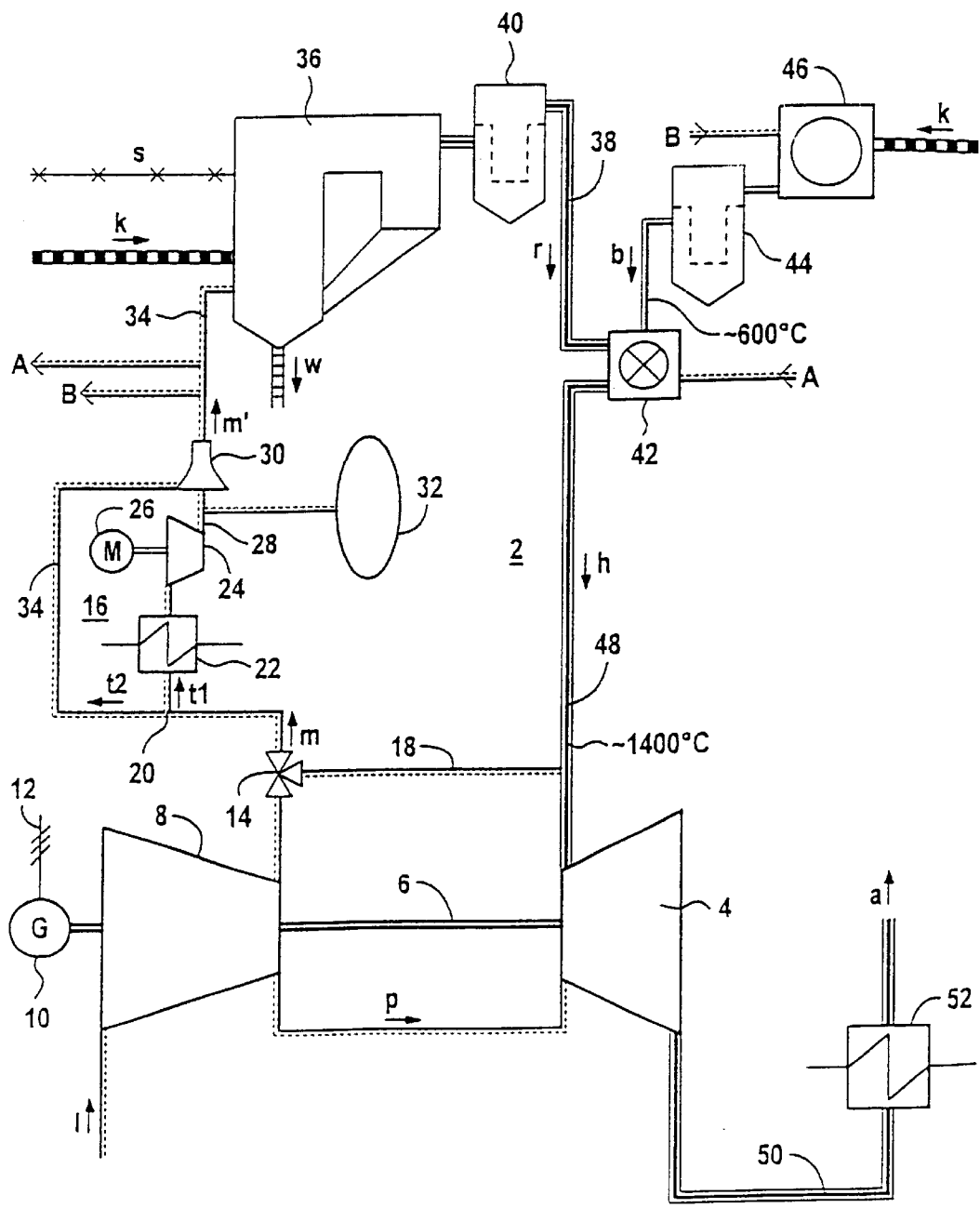

METHOD AND DEVICE FOR INCREASING THE PRESSURE OF A GAS

The invention relates to a method and device for increasing the pressure of a gas, in particular of the air delivered by a compressor in a power station, using a booster. As mentioned, the gas may be, in particular, the air which is delivered by a compressor and which is provided by the compressor in a large mass stream and at a high temperature.

In a power station with a system for coal conversion under pressure, compressed air is extracted from the outlet of a compressor and, after a gasification and/or combustion operation at high temperature, is introduced as flue gas into the expander part of a gas turbine. Owing to the coal conversion process, some pressure loss occurs along the path of the compressed air from the outlet of the compressor to the inlet of the gas turbine. In this case, to maintain the necessary distance from the compressor surge limit, this pressure loss should not exceed critical limit values (surge limit curve, operating limit curve) along the path from the compressor outlet to the turbine inlet. In such a power station, then, there may be a very high pressure loss, since, depending on the set-up, particular structural components, such as a device for pressure-type fluidized-bed firing, a coal gasifier, a device for gas scrubbing and/or an afterburner, may be arranged in the path of the air. In the case, for example, of a power station operating with a device for second-generation pressure-type fluidized-bed firing, this pressure loss is of the order of magnitude of 2 bar. Without further measures, this high pressure loss would make it impossible to use a gas turbine of the power output class "heavy-duty gas turbine".

It may be envisaged, then, to overcome the high pressure loss by the installation of a blower or booster.

Such a booster has to be designed for the entire mass stream of air required. However, a booster of this type, such as is available today, for material reasons allows only an operating temperature which is possibly below that of the air flowing in from the compressor. In this booster solution, therefore, where appropriate, it is necessary, in addition, also to have a relatively large and cost-intensive air cooler which has to be connected upstream of the booster. The booster itself is likewise costly because of the unconventional requirements, to be precise, with regard to controlling a very large mass stream, generating a relatively small pressure difference of about 1.5 bar and maintaining high temperatures.

The object of the invention, accordingly, is to specify a method and a device of the type initially mentioned for increasing the pressure of a gas, in which use is likewise made of a booster or a blower, but in which the desired pressure increase can be achieved comparatively cost-effectively.

Where the method is concerted, this object is achieved, according to the invention, in that the mass stream of the gas is subdivided into a smaller part stream and into a larger part stream, in that the smaller part stream is delivered via the booster to an ejector and is combined there with the larger part stream which is supplied to the suction nipple of the ejector, and in that the combined mass stream of the gas is picked up at the outlet of the ejector.

In order here, where appropriate, to protect the booster against temperatures which are too high, there is provision, according to a development, for the smaller part stream to be cooled before delivery to the booster.

The smaller part stream can be approximately 20 to 40% of the mass stream of the delivered gas.

In the power station sector, the mass stream ratio is dependent on the component design.

It is advantageous if the smaller part stream occurring at the outlet of the booster is smoothed with respect to pressure fluctuations.

For the initially mentioned application of the method in a power station, with a device for second-generation pressure-type fluidized-bed firing, it is particularly advantageous if the pressure difference in the mass stream before subdivision and after combination is such that the pressure loss occurring between the outlet of the compressor and the inlet of the gas turbine is not only reduced, but is compensated virtually completely.

The device, provided for achieving said object, for increasing the pressure of a gas is distinguished, according to the invention, by a stream divider, by means of which the mass stream of the gas can be subdivided into a smaller part stream and into a larger part stream, by an ejector, to which the smaller part stream can be delivered via the booster, and by a bypass line, via which the larger part stream can be delivered to the suction nipple of the ejector.

Should the delivered gas stream have a temperature which is too high, so the booster would be put at thermal risk, there is provision, according to a development, for the smaller part stream to be delivered to the booster via an air cooler.

According to a further advantageous design, there is provision for the booster to be connected to the ejector via a line, to which a buffer tank is connected for the smoothing of pressure fluctuations.

The outlet of the ejector may be connected, in a power station, to various components which require the increased-pressure gas, in particular air, for their operation.

Further advantageous refinements are characterized in the subclaims.

An exemplary embodiment of the invention is explained in more detail below by means of a FIGURE.

The FIGURE shows a power station 2 with a gas turbine 4, on the shaft 6 of which are seated a compressor 8 and an electrical generator 10. The generator 10 delivers electric energy into a network 12. Intake air 1 is supplied to the compressor 8 via a filter (not shown). The intake air 1 compressed by the compressor 8 is supplied, on the one hand, to the gas turbine 4 as cooling air p and, on the other hand, to further components of the power station 2 as a mass stream m. This mass stream m passes via a three-way valve 14 into a device 16 for increasing the pressure. In an emergency, the mass stream m can be fed directly into the gas turbine 4 by the three-way valve 14 via an emergency bypass 18.

The device 16 possesses a stream divider 20, by means of which the mass stream m of the gas is subdivided into a smaller part stream t1 and into a larger part stream t2. The mass stream ratio of these two part streams t1, t2 is dependent on the design of the further components and here is, for example, 20% to 80%. The smaller part stream t1 is delivered via an air cooler 22, which is connected into a water/steam circuit (not shown), to a booster 24 which is driven by a motor 26. This booster 24 is connected to an ejector 30 via a line 28. A buffer tank 32 is connected to the line 28 for the smoothing of pressure fluctuations. The larger part stream t2 is supplied to the suction nipple of the ejector 30 via a bypass line 34. Thus, in this ejector 30, the two part streams t1, t2 are combined again, so that the combined mass stream m' of the air can be picked up at its outlet. According to the pressure losses occurring in the following components, in the present case the pressure difference in the mass streams m and m' is about 2 bar.

The outlet of the ejector 30 is connected via an outlet line 34 to a device 36 for pressure-type fluidized-bed firing. Provided on this outlet line 34 are two air extraction points which are designated by A and B and which lead to further components of the power station 2.

The device 36 is not only fed with compressed air, but also with coal k and with a sorbent s, for example with limestone ($CaCO_3$). Fluidized-bed ash w is drawn off at an outlet. The fluidized-bed flue gas r occurring in the device 36 and having, for example, a temperature of 900° C. is delivered to an afterburner 42 via a line 38, in which a flue-gas filter 40 is located. Moreover, this afterburner 42 is supplied with air from the air extraction point A. The fluidized-bed flue gas r may have, for example, a temperature of 900° C.

Moreover, the afterburner 42 is fed with a fuel gas b. This fuel gas b may have, for example, a temperature of 600° C. It is extracted from a coal gasifier 46 via a fuel-gas filter 44. This coal gasifier 46 is fed, on the one hand, with coal k and, on the other hand, with air from the air extraction point B.

Hot flue gas h, which has, for example, a temperature of about 1400° C., leaves the afterburner 42. It is delivered via a flue-gas line 48 to the inlet of the gas turbine 4.

The exhaust gas a emitted by the gas turbine 4 is supplied, via an exhaust-gas line 50 and a waste-heat boiler 52, to a chimney (not shown) for discharge into the surroundings.

In summary, therefore, it can be said: the mass air stream m to be compressed is separated predominantly into a smaller and a larger part stream t1 and t2. As already mentioned, the ratio of the two mass streams t1, t2 is dependent on the component design. The smaller part stream is cooled from, for example, 400° C. to about 150–200° C. in the air cooler 22. The heat exchanger 22 required for this purpose is substantially smaller and therefore more cost-effective than if the entire mass stream m had to be cooled. The smaller part stream t1 is subsequently compressed with a very high pressure difference in the booster 24. This pressure difference may amount, for example, to 10 to 20 bar. A compressor or booster 24 of this type, which is designed for a relatively small mass stream with a high pressure difference, is a conventional component. It is therefore considerably more cost-effective than the above-mentioned booster for large mass streams and low pressure differences. The buffer tank 32 for the reduction of pressure fluctuations is mounted on the pressure side of the booster 24.

The larger part stream t2 is led in the bypass line 34 past the air cooler 22, the booster 24 and the pressure buffer or buffer tank 32. It arrives at the suction nipple of the ejector 30 which is constructed on the principle of what is known as a water jet pump or steam jet pump. The smaller part stream t1 at its higher pressure level serves in this case as the propulsion or acceleration medium for the ejector 30. The total air stream m' at the outlet of the ejector 30 is set by means of the device 16 in such a way that it has the total pressure necessary for compensating the required amount of pressure losses of the system located between the outlet of the compressor 8 and the inlet of the gas turbine 4.

As compared with the booster solution described initially, according to which the total mass stream is supplied to an air cooler and to a following booster, here, because of the smaller air stream t1 to be cooled, the heat capacity to be transmitted to the water/steam circuit connected to the air cooler 22 is reduced. The power output fraction of the gas turbine 4 in the overall power output and consequently the overall efficiency are increased.

As compared with said booster solution outlined initially, the essence of the present invention lies in the replacement of two large and costly components for pressure increase, to be precise a large air cooler and a large booster, by a system which consists of an air cooler 22 and of a conventional booster 24 of smaller size and also of an ejector 30 and a buffer tank 32. This results in a cost saving, particularly to the smaller booster 24 with a higher pressure ratio, since this dimensioning is conventional and is consequently relatively cost-effective. As regards the air cooler 22, too, the smaller form of construction has a highly cost-reducing effect.

What is claimed is:

1. A method for increasing the pressure of a gas from a compressor with a booster, comprising:

subdividing a mass stream of the gas into a relatively smaller part stream and into a relatively larger part stream;

cooling the relatively smaller part stream;

delivering the relatively smaller part stream to an ejector via the booster; and combining the relatively smaller part stream with the relatively larger part stream at the ejector, wherein the relatively larger part stream is supplied to a suction nipple of the ejector and wherein the combined mass stream of the gas is picked up at an outlet of the ejector.

2. The method as claimed in claim 1, wherein the relatively smaller part stream is about 20–40% of the mass stream of the delivered gas.

3. The method as claimed in claim 1, wherein the relatively smaller part stream emerging at the outlet of the booster is smoothed with respect to pressure fluctuations.

4. The method as claimed in claim 1, wherein a pressure difference in the mass stream before subdivision and after combination is about 2 bar.

5. The method as claimed in claim 2, wherein the relatively smaller part stream emerging at the outlet of the booster is smoothed with respect to pressure fluctuations.

6. The method as claimed in claim 2, wherein a pressure difference in the mass stream before subdivision and after combination is about 2 bar.

7. The method as claimed in claim 3, wherein a pressure difference in the mass stream before subdivision and after combination is about 2 bar.

8. The method of claim 1, wherein the gas includes air delivered in a power station.

9. The method as claimed in claim 2, wherein the relatively smaller part stream is about 20% of the mass stream of the delivered gas.

10. A device for increasing pressure of a gas from a compressor with a booster, comprising:

a stream divider, via which a mass stream of the gas is adapted to be subdivided into a relatively smaller part stream and a relatively larger part stream;

an ejector, to which the relatively smaller part stream is adapted to be delivered by the booster; and a bypass line, via which the relatively larger part stream is adapted to be delivered to a suction nipple of the ejector, wherein the relatively smaller part stream is adapted to be delivered to the booster via an air cooler.

11. The device as claimed in claim 10, wherein the relatively smaller part stream is about 20–40% of the mass stream of the delivered air.

12. The device as claimed in claim 10, wherein the booster is coupled to the ejector via a line, to which a buffer tank is coupled for smoothing of pressure fluctuations.

13. The device as claimed in claim 10, wherein the output of the ejector is coupled to at least one of a device for pressure-type fluidized-bed firing, an after burner and a coal gasifier.

14. A power station, including the device as claimed in claim 10.

15. The device of claim 11, wherein the booster is connected to the ejector via a line to which a buffer tank is connected for smoothing of pressure fluctuations.

16. The device as claimed in claim 11, wherein the relatively smaller part stream is about 20% of the mass stream of the delivered air.

17. The method as claimed in claim 11, wherein the relatively smaller part stream is about 20–40% of the mass stream of the delivered gas.

18. The device as claimed in claim 11, wherein the output of the ejector is coupled to at least one of a device for pressure-type fluidized-bed firing, an after burner and a coal gasifier.

19. The device as claimed in claim 12, wherein the output of the ejector is coupled to at least one of a device for pressure-type fluidized-bed firing, an after burner and a coal gasifier.

20. A power station, including the device as claimed in claim 10, and further including a device for pressure-type fluidized-bed firing and a coal gasifier.

* * * * *